358-74. XR 3,780,216 SR

United States Patent [19]

Viscardi

[11] 3,780,216

[45] Dec. 18, 1973

[54] APPARATUS FOR DETECTING IONIZATION RADIATION EMANATING FROM A TELEVISION RECEIVER

[76] Inventor: Frank Viscardi, 16 Benson Rd., Glen Rock, N.J. 07452

[22] Filed: July 13, 1971

[21] Appl. No.: 162,050

[52] U.S. Cl...... 178/5.4 R, 178/5.4 TE, 178/DIG. 4, 250/83.6 P

[51] Int. Cl........................... H04n 9/16, H04n 5/44

[58] Field of Search ...................... 178/5.4 R, 5.4 E, 178/7.3 R, 7.5 R, DIG. 4; 250/71.5 R, 178/83.3 R, 83.6 R, 83.6 P

[56] References Cited

UNITED STATES PATENTS

| | | | |
|---|---|---|---|
| 3,569,711 | 3/1971 | Stoms et al. | 250/83.6 R |
| 3,469,031 | 9/1969 | Setchell | 178/7.9 |
| 3,546,536 | 12/1970 | Umin | 178/7.3 R |

*Primary Examiner*—Robert L. Griffin
*Assistant Examiner*—George G. Stellar
*Attorney*—Hubbell, Cohen & Stiefel

[57] ABSTRACT

An apparatus for detecting ionization radiation, such as x-ray radiation, emanating from a television receiver such as the color picture tube, voltage regulator tube and high voltage rectifier tube thereof. The apparatus includes a detection means, such as a Geiger counter tube. This tube is operatively connected in parallel to the high voltage supply that drives the picture tube and the audio portion of the receiver for providing an aural alarm signal through the speaker in response to the detection of radiation above a minimum allowable level. If the high voltage rises, such as due to failure of the high voltage regulation circuit, the sensitivity in the Geiger tube rises, as does the amount of radiation, which causes a distinct aural alarm through the speaker.

7 Claims, 2 Drawing Figures

PATENTED DEC 18 1973 3,780,216

INVENTOR
FRANK VISCARDI
BY

ATTORNEYS

APPARATUS FOR DETECTING IONIZATION RADIATION EMANATING FROM A TELEVISION RECEIVER

BACKGROUND OF THE INVENTION

1. Field of the Invention

The present invention relates to the detection of ionization radiation emanating from a television receiver.

2. Description of the Prior Art

The detection of harmful radiation such as x-ray radiation emanating from conventional home television receivers is rapidly becoming a critical problem. With the widespread acceptance and utilization of color television receivers, this problem is becoming even more critical. The cathode ray tube of such a color television receiver, while in operation, emits x-ray radiation from the unshielded portions of the picture tube, as well as does the voltage regulator tube and the high voltage rectifier tube. Since the television watchers are normally in fairly close proximity to the television screen, they invariably receive a dosage of this x-ray radiation. Under normal circumstances, the amount of x-ray radiation received is quite minimal. However, recent U.S. Government investigations have discovered that certain television receivers emit x-ray radiation at a level sufficient to be considered harmful.

The amount of x-ray radiation emitted from the receiver picture tube, voltage regulator tube and high voltage rectifier tube is dependent on the driving voltage of the associated tube. This is one of the reasons that the x-ray radiation emission problem has become much more critical in color television receivers than in previous black and white receivers, as the driving voltage for a color television receiver is considerably higher. Under normal circumstances, the driving voltage of the picture tube is controlled or regulated by a high voltage regulation circuit. However, in the event that this circuit fails, and the voltage rises above the normal operating value, a significant increase in x-ray radiation emission can result.

Prior art x-ray radiation detection devices presently available are both costly and inefficient. One such prior art device is a simple photographic film badge which could be worn by the television watcher. However, such a badge, which becomes exposed by x-ray radiation emissions, must be visually observed constantly by the wearer, which is quite difficult when the wearer is also attempting to watch television. Another such prior art device involves the use of an independent Geiger counter which could be placed near the picture tube. However, such a Geiger counter is costly and impractical for the ordinary television watcher. Furthermore, such a Geiger counter only acts as an x-ray radiation monitor and is not capable of providing a relatively instantaneous indication of failure of the high voltage regulation circuit of the television receiver, which indication is critical to minimizing the x-ray radiation dosage obtained by the television watcher.

These disadvantages of the prior art are overcome by the present invention.

SUMMARY OF THE INVENTION

An apparatus for detecting ionization radiation, such as x-ray radiation emanating from a television receiver, includes an ionization radiation detection means, such as a Geiger counter tube, which is operatively connected in parallel to the high voltage supply utilized to drive the cathode ray tube or picture tube and to the audio portion of the receiver. The Geiger counter tube is preferably biased at a voltage equivalent to the minimum allowable x-ray radiation. As radiation emanating from the television receiver above this value is detected an aural alarm signal, such as a Geiger count click, is provided through the receiver speaker. As the sensitivity of the Geiger counter tube is dependent on the value of the high voltage supply, which value is regulated by a high voltage regulation circuit, a failure of this circuit causes the high voltage to rise. This causes the sensitivity of the Geiger counter tube as well as the detected radiation to rise which causes a distinct aural alarm signal from the speaker. In this manner high voltage regulation failure monitoring and x-ray radiation monitoring are provided.

DETAILED DESCRIPTION OF THE PREFERRED EMBODIMENT

Figures 1, 2:
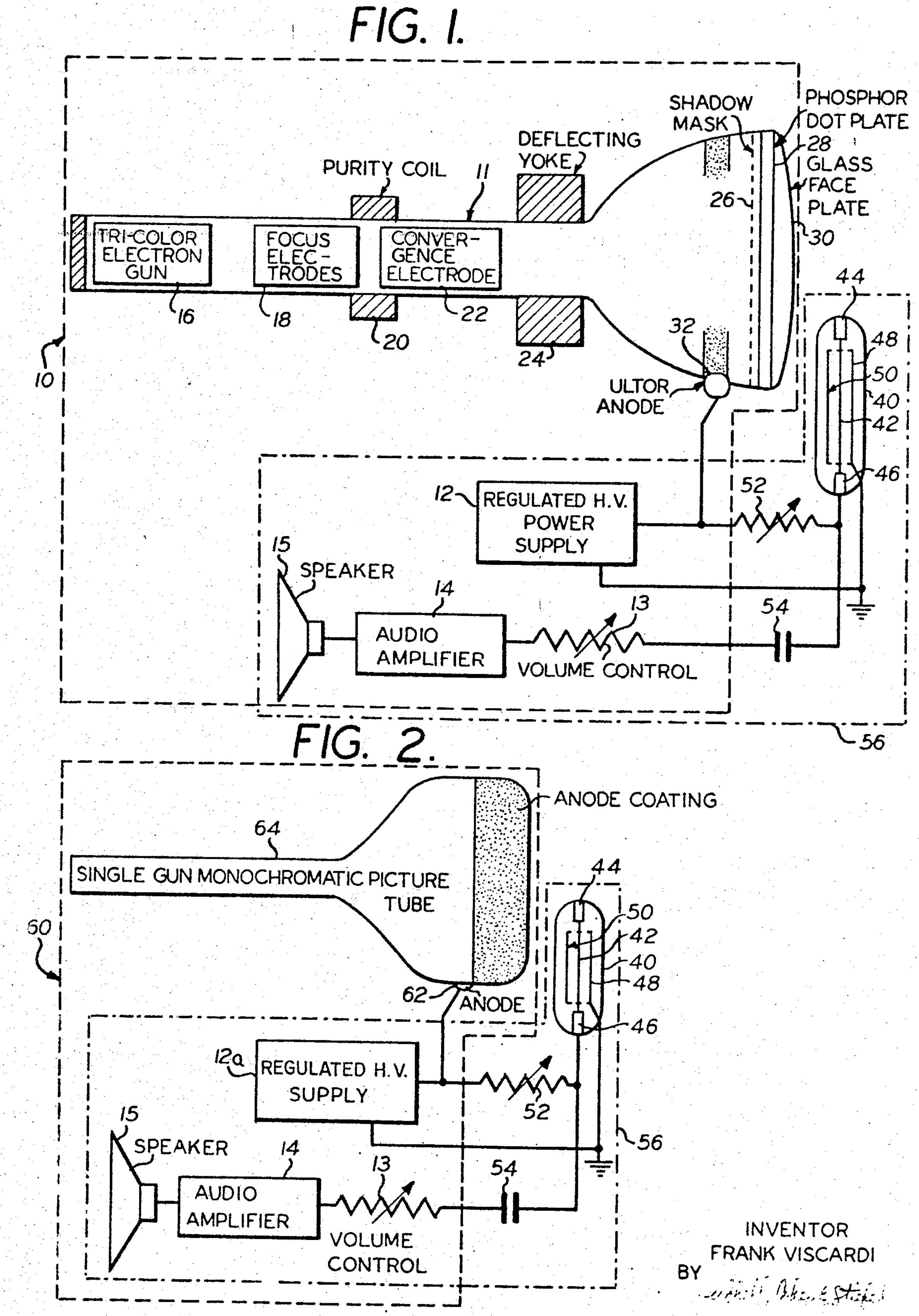
FIG. 1 is a diagrammatic illustration, partially in schematic of the preferred embodiment of the present invention.
FIG. 2 is a view similar to FIG. 1 of an alternative embodiment of the present invention.

Referring now to the drawing in detail and especially to FIG. 1 thereof, a conventional color television receiver 10 is illustratively shown. Such a receiver 10 includes a video portion for displaying the received color video information and an audio portion for transmitting the received audio information contained in the combined television signal which contains both audio and video information. The video portion normally includes a conventional tri-color cathode ray tube or, as it is commonly known, a color picture tube 11 and associated circuitry for receiving the composite video signal portion of the combined television signal, separating the composite video signal into the color picture signal and the vertical and horizontal sync pulses, and then applying these signals to the picture tube 11 in order to reproduce a colored video image. In order to understand the present invention, only the high voltage power supply 12 and the color picture tube 11 portions of the video portion of the receiver 10, and the volume control 13, audio amplifier 14 and speaker or audio output means 15 portions of the audio portion of the receiver 10 are illustrated. The balance of the associated video and audio circuitry, such as the color killer circuit, the chroma amplifier, the video amplifiers, the sync separator, the vertical deflection oscillator, the vertical deflection amplifier, the horizontal deflection amplifier, the blanking circuit, the sound demodulator and so forth, all of which are well known, have been omitted for purposes of clarity.

The color picture tube 11, which as was previously mentioned is a conventional color picture tube, such as a conventional Chromatron or Lawrence tube, contain a tri-color electron gun 16 for producing red, green and blue electron beams in a conventional manner, focus electrode 18 for focusing these beams, a purity coil 20 for adjusting color purity, a convergence electrode 22 for converging the electron beams, a deflecting yoke 24 for deflecting the electron beams, a shadow mask 26, a phosphor dot plate 28 and a face plate or screen 30 which is normally glass. The electron gun 16 contains the tri-color cathodes, the control electrodes therefor and associated accelerating electrodes or anodes. The color picture tube 11 also normally contains an ultor anode 32, commonly termed the second anode, which is the electrode or set of electrodes to which the highest D-C voltage is applied in the picture tube 11 in order to accelerate the electron beam before deflection. The ultor anode 32 normally takes the form of a conductive coating on the inside wall of the picture tube 11 near the flared portion close to the screen or face plate 30.

It is this ultor anode 32 to which the high voltage power supply 12 of the color receiver 10 is connected. This voltage supply 12 is considerably higher than the voltage supply to the electron gun 16 of the picture tube 11, which voltage is normally termed the low-voltage power supply in order to distinguish it from the high voltage power supply. Normally, the ultor anode 32 of the picture tube 11 is at a potential between about 13,000 and 20,000 volts. A high voltage of this order is required in order to produce an intense electron beam that strikes the screen with sufficient force to attain a bright picture over the entire area. The high voltage required for the high voltage power supply 12 may be obtained in any conventional fashion such as by use of a conventional flyback or kickback power supply arrangement wherein the required high voltage is obtained from the horizontal output stage (not shown) of the television receiver 10.

The circuit of the present invention, which is an apparatus for detecting ionization radiation emanating from the television receiver 10, and especially from the color picture tube 11, and high voltage supply 12 voltage regulator and rectifier tubes thereof, preferably includes an ionization radiation detection means, which is preferably a conventional Geiger counter tube 40 having an anode 42, which is an insulated anode supported between insulators 44 and 46, a cathode 48 spaced from the anode 42, and a gas filled cylindrical metal chamber 50 which forms an ionization chamber, the anode 42 being contained along the longitudinal axis of the ionization chamber 50. The anode 42 of the Geiger counter tube 40 is connected to the high voltage supply 12 through a variable impedance 52 which is preferably selected so as to bias the Geiger counter tube 40 at a voltage equivalent to the desired minimum allowable quantity of emitted radiation. The anode 42 is also connected in parallel through a capacitor 54 to the volume control 13 of the audio portion of the receiver 10 which is in turn connected through the audio amplifier 14 to the speaker 15. The cathode 48 of the Geiger counter tube 40 is connected to ground. As is illustratively shown in FIG. 1, the Geiger counter tube 40 is preferably operatively positioned with respect to the color picture tube 11 so as to be capable of detecting any ionization radiation emanating from the color picture tube 11, such as through the face plate 30 thereof, as well as from the high voltage supply 12. Preferably, the Geiger counter tube 40 is so arranged and so biased as to detect x-ray radiation emanating from the color picture tube 11 and the high voltage supply 12 voltage regulator and rectifier tubes.

The operation of the circuit is as follows. The Geiger tube 40 operates in a conventional manner to produce a pulse output in response to the detection of ionization radiation which causes a potential which is greater than a bias potential on the tube 40. In the present invention, any x-ray radiation emanating from the color picture tube 11 striking the Geiger tube 40 so as to cause a potential difference in the tube greater than the bias potential of the tube, causes a pulse output to be developed from the anode 42 of the tube 40. This pulse output, which is fed to the audio portion of the receiver 10 through the audio amplifier 14 and speaker 15, produces a click in the speaker 15 which is similar to a conventional Geiger counter output. This click, therefore, provides an aural output in response to the detection of x-ray radiation in the same manner as the normal Geiger counter in both rate and intensity and, accordingly, provides an aural warning of the detection of the x-ray radiation. As the detected x-ray radiation increases, both the rate and intensity of the aural alarm will increase as in a conventional Geiger counter. In addition, as the high voltage of the receiver 10 rises, such as due to the failure of the high voltage regulating circuit in the receiver 10, the sensitivity of the Geiger tube 40 rises, the sensitivity of the Geiger tube being directly dependent on the value of the high voltage power supply bias potential. This increase in high voltage, which is accompanied by an increase in x-ray radiation from the color picture tube 11, and which correspondingly increases the sensitivity of the Geiger tube 40, produces a distinct aural alarm from the speaker 15, the output of the speaker sounding similar to an automobile horn. In this manner the ionization radiation detection system of the present invention functions both as an x-ray radiation monitor and a high voltage regulation failure monitor for the color television receiver 10.

Referring now to FIG. 2, an ionization radiation detection system 56, which is preferably identical with that shown and described in FIG. 1, is illustrated as being utilized in a conventional black and white television receiver 60. As in FIG. 1, only the pertinent portions of the video and audio portions of the receiver 60 are illustrated for purposes of clarity, the balance of the well known associated video and audio circuitry, such as the video amplifiers, sync separators, vertical deflection oscillator, vertical deflection amplifier, horizontal deflection oscillator, horizontal deflection amplifier, sound demodulator, and so forth being omitted for purposes of clarity. The high voltage supply 12*a* associated with the receiver 60 and ionization radiation detection system 56 shown in FIG. 2 is substantially similar to the high voltage power supply 12 previously described with reference to FIG. 1; however, since the television receiver illustrated in FIG. 2 is a conventional black and white television receiver as opposed to a color television receiver, the value of this voltage supply is lower in potential value and is normally between 5,000 and 10,000 volts. This high voltage supply 12*a* is normally connected to the final accelerating anode 62 of a single gun monochromatic picture tube 64, anode 62 ordinarily taking the form of a conductive coating, such as Aquadag, on the inside wall of the picture tube 64 near the flared portion, almost up to the screen. The high voltage supply 12*a* may be obtained in the same manner as previously mentioned with respect to high voltage supply 12 by obtaining the required high voltage from the horizontal output stage of the receiver 60, this circuit then being termed a flyback or kickback power supply. The structure and operation of the ionization detection radiation system 56 associated with the black and white television receiver illustrated in FIG. 2 is identical with that previously described with reference to the color television receiver shown in FIG. 1 and will not be described in greater detail hereinafter.

By utilizing the ionization radiation detection system of the present invention, harmful x-ray radiation emanating from a television receiver can be detected and an aural dynamic real time alarm can be provided to the watcher. In addition, a real time indication of high voltage failure regulation is also provided to the watcher so that he can turn off the television set before a significant amount of harmful x-ray radiation can be emitted. If desired, a control circuit can be associated with the ionization radiation detection system of the present invention so that when a predetermined value of x-ray radiation is detected the television receiver can be automatically shut off.

It should, of course, be understood that the ionization radiation detection system of the present invention could be constructed as an integral portion of the television receiver or could be provided in a kit form for installation in a conventional presently commercially available television receiver without departing from the present invention.

It is to be understood that the above described embodiment of the invention is merely illustrative of the principles thereof and that numerous modifications and embodiments of the invention may be derived within the spirit and scope thereof.

What is claimed is:

1. An apparatus for detecting ionization radiation emanating from a television receiver, said receiver having a video portion including a cathode ray tube having an anode, and an audio portion including an audio output means, said apparatus comprising:

a high voltage power supply operatively connected to said cathode ray tube anode for driving said cathode ray tube; said audio output means comprising a volume control means; and an ionization radiation detection means comprising an ionization chamber provided with an anode and a cathode, said detection means anode being operatively connected in parallel to said high voltage power supply and to said audio portion volume control means, means electrically interposed between said high voltage power supply and said detection means anode for biasing said detection means at a predetermined threshhold value equivalent to a predetermined value of detectable radiation, said detection means being operatively positioned with respect to said cathode ray tube for detecting ionization radiation emanating therefrom; said audio output means being responsive to said detected ionization radiation emanating from said cathode ray tube above said predetermined equivalent value to provide an aural response as an alarm signal in response thereto; said receiver further including a means for regulating the value of said high voltage supply, said detection means having a controllable sensitivity which is directly dependent on said high voltage supply value, said sensitivity increasing as said high voltage supply value increases, said audio output means providing a different distinct aural alarm signal as an aural response therefrom when said high voltage has increased beyond a predetermined value, said increase being indicative of high voltage regulation failure, whereby said ionization detection means provides both radiation detection and high voltage regulation monitoring for said television receiver.

2. An apparatus in accordance with claim 1 wherein said ionization radiation detection means is a radiation counter tube, said detection means anode being an insulated electrode located along the longitudinal axis of the ionization chamber.

3. An apparatus in accordance with claim 2 wherein said tube is a Geiger counter tube.

4. An apparatus in accordance with claim 1 wherein said audio portion includes an amplifier means operatively connected to said audio output means and to said detection means anode through said volume control means, said detection means providing a pulse signal to said amplifier at least in response to the detection of said ionization radiation emanating from said cathode ray tube which is above said predetermined equivalent value, said amplifier producing said aural response from said audio output means in response to said pulse signal.

5. An apparatus in accordance with claim 1 wherein said cathode ray tube is a color picture tube having an ultor anode, said ultor anode being said cathode ray tube high voltage anode.

6. An apparatus in accordance with claim 1 wherein said biasing means comprises a bias impedance having a value determined by said threshhold value.

7. An apparatus in accordance with claim 1 wherein said detected ionization radiation is x-ray radiation.

* * * * *